United States Patent [19]

Doman

[11] Patent Number: 4,977,817
[45] Date of Patent: Dec. 18, 1990

[54] MOTION MODIFIER METHOD AND APPARATUS

[76] Inventor: David G. Doman, 927 Bayview Drive, Delta, British Columbia, Canada, V4M 2R5

[21] Appl. No.: 268,708

[22] Filed: Nov. 7, 1988

[51] Int. Cl.$^5$ .......................... F01B 9/00; F16H 25/20
[52] U.S. Cl. ........................................... 92/31; 74/110; 74/99 R; 74/99 A; 92/140; 417/415
[58] Field of Search ................... 74/99 R, 99 A, 110, 74/586, 828, 838; 92/31, 140; 123/78 E; 417/415; 60/567, 594

[56] References Cited

U.S. PATENT DOCUMENTS

| 951,318 | 3/1910 | Kjerulff | 92/31 X |
| 1,104,804 | 7/1914 | James | 123/78 E |
| 1,356,241 | 10/1920 | Keulen | 74/110 |
| 2,507,167 | 5/1950 | Lemmerman | 74/99 A X |
| 2,929,253 | 3/1960 | Baldelli | 74/586 X |
| 3,046,802 | 7/1962 | Cupedo | 74/110 |
| 3,200,597 | 8/1965 | Stotz | 60/594 |
| 4,556,371 | 12/1985 | Post | 417/539 |
| 4,653,383 | 3/1987 | Henderson | 74/586 |

Primary Examiner—Allan D. Herrmann

[57] ABSTRACT

A displacement apparatus for allowing relative displacement between two reciprocating members such that a predetermined output motion profile of one of the members may be obtained relative to the motion of the other of the reciprocating members.

6 Claims, 3 Drawing Sheets

MOTION MODIFIER METHOD AND APPARATUS

INTRODUCTION

This invention relates to a mechanism for modifying the motion of one of two reciprocating members and, more particularly, to a mechanism which is utilized to modify the relative displacement between two reciprocating members used in a pump.

BACKGROUND OF THE INVENTION

In mechanically driven pumps, the linear crosshead motion of a crank-driven reciprocating piston approximates a sinusoid when the crank is driven at a constant rotational speed. This sinusoidal type motion results in an uneven flow of liquid which can be damaging to system components such as valves and piping One technique used to assist in reducing this uneven flow is to combine the flows of multiple cylinders driven by corresponding crossheads. These crossheads are moved by a common crankshaft with crank throws spaced at appropriate regular angular intervals. When using such systems, pump flowrates may be obtained which are approximately constant but which still contain cyclical fluctuations. These flow fluctuations may combine to cause damaging pressure pulsations in the hydraulic systems which, as discussed, can lead to premature failure of piping and related components over time.

SUMMARY OF THE INVENTION

According to one aspect of the invention, there is disclosed displacement apparatus comprising a first reciprocating member, a second reciprocating member connected to said first reciprocating member, relative displacement means mounted between said first and second members, one of said first or second members being movable relative to said displacement means and the other of said first or second members.

According to a further aspect of the invention, there is disclosed a method of producing a desired motion profile for a first reciprocating member relative to a second reciprocating member comprising producing rotary motion in said first reciprocating member relative to said second reciprocating member and converting said rotary motion of said first reciprocating member to axial movement relative to said second reciprocating member.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
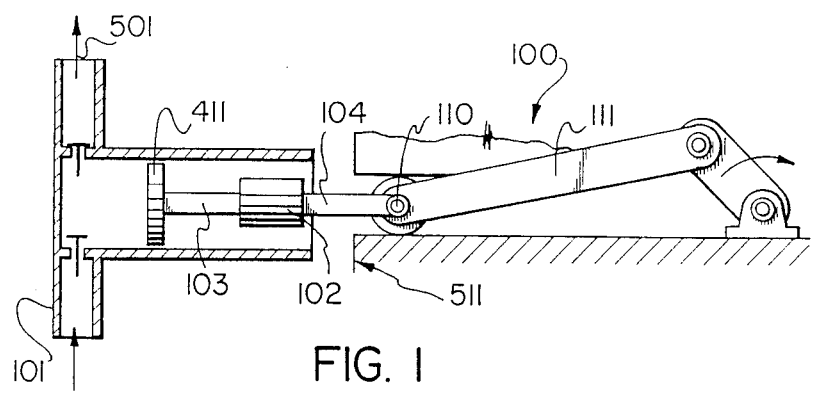
FIG. 1 is a diagrammatic side view of a crank-slider mechanism commonly used for reciprocating pumps illustrating the displacement apparatus according to the invention.

Referring now to the drawings, a crank-slider mechanism is generally shown at 100 in FIG. 1. Such a mechanism is commonly used in association with a reciprocating pump generally shown at 101. The displacement apparatus according to the invention is generally illustrated at 102 and is located between the piston rod 103 and a shaft 104 extending from the wristpin 110 of the connecting rod 111.

Figure 2:
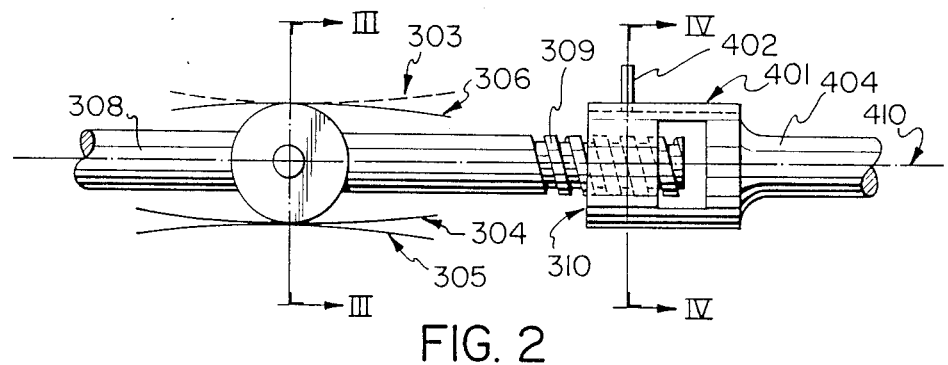
FIG. 2 is a diagrammatic side view of a first embodiment of the apparatus according to the invention.

A first embodiment of the displacement apparatus 102 is shown in FIG. 2 which illustrates two shafts 401, 308 connected by a screw thread 309 which is rotatable within female receptacle 310.

Figure 3:
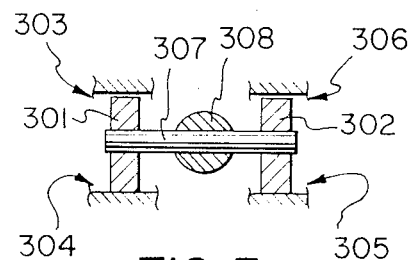
FIG. 3 is a sectional view taken along section 3—3 of FIG. 2.

As seen in FIG. 3, shaft 308 has a lateral hole through its centre to accommodate cross-shaft 307. At each end of cross-shaft 307, respective rollers 301, 302 are attached, each roller 301, 302 being freely rotatable and retained on cross-shaft 307. Roller 301 is constrained to roll on a track as defined by surfaces 303, 304 (FIG. 2). Roller 302 is constrained to roll in a track defined by surfaces 305, 306.

Figure 4:
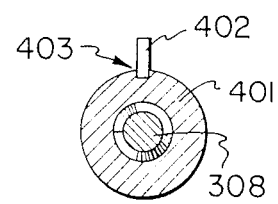
FIG. 4 is a sectional view taken along section 4—4 of FIG. 2.

Shaft 401 has a longitudinal groove 403 in its outer surface, as shown more clearly in FIG. 4. A stationary pin or peg 402 fits into this groove 403 and restrains shaft 401 from rotating about its longitudinal axis 410.

Axial movement of shaft 401 moves shaft 308 by means of the screw thread 309 mated with female coupling 310. As shaft 308 moves axially, rollers 301, 302 move therewith along their respective tracks as described. If the motion is from the right to the left as viewed in FIG. 2, tracks 305, 306 cause roller 302 to move downwardly while tracks 303, 304 cause roller 301 to move upwardly. The combined effect of these motions on cross-shaft 307 causes shaft 308 to rotate about its axis 410 as it moves lengthwise or clockwise as viewed in FIG. 3.

Shaft 401 moves axially only, since, as described, it is restrained by stationary peg 402 from any rotary motion. It is, therefore, apparent that when shaft 401 is moved axially, the rotation of shaft 308 will cause relative axial movement between shafts 401, 308 by reason of the action of the helical screw thread 309 in the female receptacle 310 by which the shafts are coupled. The axial movement of shaft 308 in response to the axial movement of shaft 401 is therefore modified by the shape of the tracks on which the rollers 301, 302 move. As the pitch angle of the interconnecting screw thread 309 is known, it is relatively easy to calculate the necessary relative rotation between shafts 308, 401 for a desired adjustment to the mechanical output displacement curve of the system, such as to piston 411 in FIG. 1 which would be connected to shaft 308. This readily defines the roller track profiles (303 304, 305, 306) which are required to achieve the desired motion for relatively pulsation reduced flow.

Figure 5:
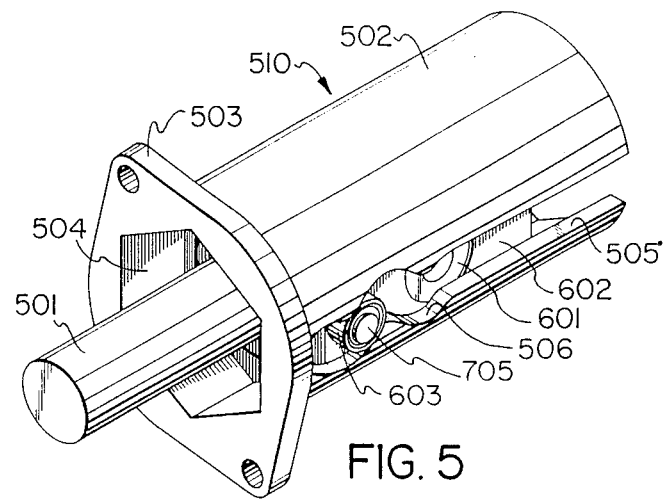
FIG. 5 is a diagrammatic isometric view of a second embodiment of the apparatus according to the invention.
Figure 6:
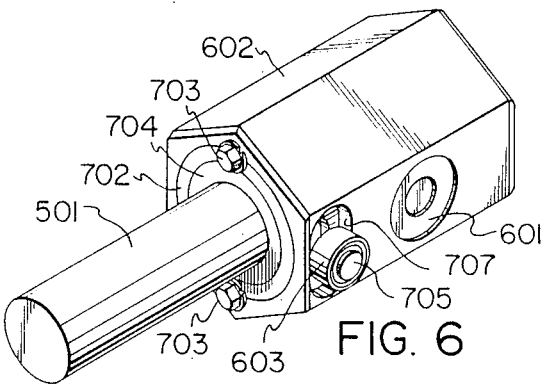
FIG. 6 is a partial diagrammatic isometric view of the insert used in the embodiment of FIG. 5.
Figure 7:
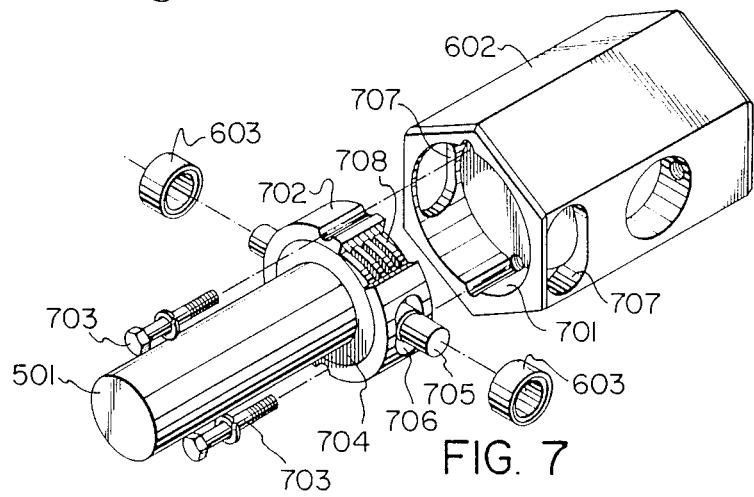
FIG. 7 is an exploded isometric view of the apparatus of FIG. 6.

A second embodiment of the invention is illustrated in FIGS. 5, 6 and 7. These figures illustrate a design suitable for use as a modification kit generally illustrated at 510 to enhance the performance of an existing reciprocating pump. The assembled kit 510 is intended to be ready for insertion into the cylindrical crosshead cavity of a typical pump 101 as, for example, is diagrammatically illustrated in FIG. 1. In such an embodiment, the output shaft 501 (FIG. 5) would drive the fluid piston 411 in FIG. 2 while the crosshead wristpin 110 of FIG. 1 corresponds to wristpin 601 of FIG. 6.

The stationary housing 502 is secured by a bolted flange 503 to a corresponding flange 511 on the crosshead and is intended to securely fit inside the cylindrical surface of the reciprocating pump crosshead. Housing 502 has a hexagonal internal recess 504 and two lengthwise shaped slots 505, diametrically opposed, one of which is illustrated in FIG. 5. Each slot 505 has a shaped profile 506 in the working portion of the slot 505, the straight portion of slot 505 providing a convenient method of assembling the internal components into housing 502 when it is bolted into the pump crankcase casting.

FIG. 6 illustrates the assembled internal crosshead component assembly 602 with the housing 502 removed. The assembly 602 reciprocates in the housing 502 under the action of a conventional connecting rod driving wrist pin 601. The hexagonal external profile 602 is a sliding fit inside housing 502, the shape thus preventing rotation of the crosshead assembly. This hexagonal shape serves the same function as pin 402 of FIG. 2 but reduces the loading inherent with the use of pin 402. Rollers 603 are provided to move along the curved profile 506 and rotate shaft 501 relative to assembly 602 as best seen in FIG. 7.

The crosshead component assembly 602 has a cavity 701 which houses cylindrical insert 702. Insert 702 has an internal helical screw thread (not illustrated) similar to the helical screw thread 309 illustrated in FIG. 2. Insert 702 is securely retained inside crosshead 602 by bolts 703 so as to resist relative rotation. An inner component 704 is non-rotatably fixed to shaft 501 by means of cross-shaft 705 and has a helical screw thread 708 on its external surface, mating with the aforementioned screw thread 702. Thus, it is free to rotate in a helical manner as already described in association with the embodiment of FIG. 2.

Cross-shaft 705 is fitted in a matching hole in insert 702 which passes transversely through shaft 501 and inner component 702, and carries rollers 603 at its ends. Clearance slots 706 are provided in insert 702 to permit limited angular rotation of cross-shaft 705 relative to housing 702. Similar slots 707 are provided in crosshead 602 to accommodate this motion.

As the crosshead moves reciprocally inside the stationary housing 502, relative axial motion is produced between shaft 501 and crosshead 602 by means of the helical screw thread. This helical motion is controlled by the shape of curved profiles 506 and the resulting action of rollers 603, which define the angular position of shaft 705 and hence the resulting helical motion. In this way, modifications are made to the instantaneous output of the pump to largely eliminate or substantially reduce undesirable flow fluctuations.

Figure 8:
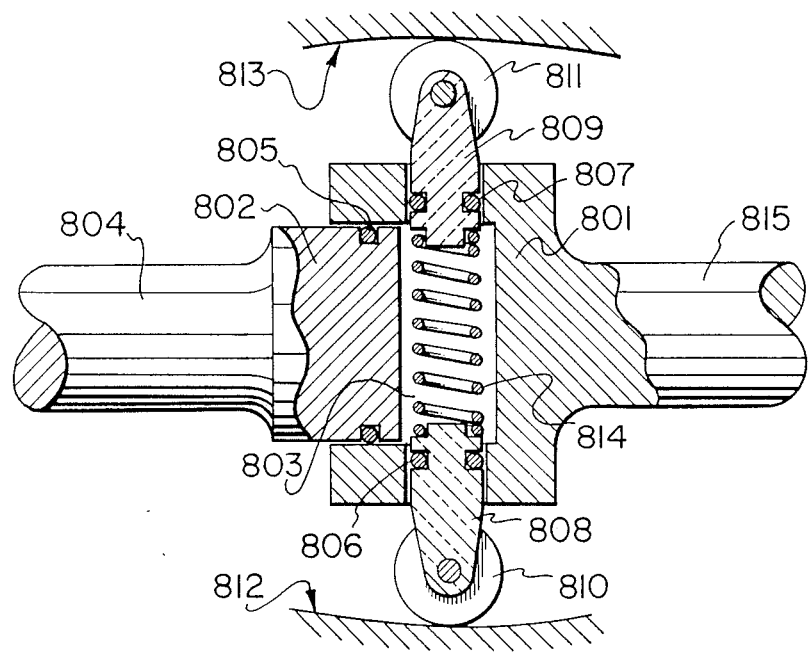
FIG. 8 is a diagrammatic sectional view of a third embodiment of the apparatus according to the invention.

FIG. 8 illustrates yet a third embodiment of the invention, wherein relative axial movement between shafts 804, 815 is achieved by means of the hydraulic action of an incompressible fluid located in cavity 803. Shaft 815 is attached to a housing 801 containing the cylindrical cavity 803 which is filled with incompressible fluid. This cavity is closed by a cylindrical piston 802 which is attached to output shaft 804 and which carries a seal 805 which blocks entry or exit of fluid from the cavity 803.

Two secondary cylindrical holes 806, 807 are drilled through the sides of housing 801 and are sealed by cylindrical pistons 808 and 809 which are similarly equipped with seals 816 to prevent fluid ingress or egress from cavity 803.

Pistons 808, 809 terminate in rollers 810, 811, which move in contact with profiled surfaces 812, 813 under the action of internal spring 814. As shafts 804, 815 move axially, rollers 810, 811 move pistons 808, 809 together or apart, depending upon the shape of profiled surfaces 812, 813. This motion forces piston 802 and hence, shaft 804, to move axially relative to shaft 815 due to the incompressible nature of the fluid in cavity 803. The motion of shaft 804, therefore, is reasonably calculated such that the output shaft 804 will acquire a desired motion operating profile.

While specific embodiments of the invention have been described, such descriptions should be considered as illustrative embodiments of the invention only and not as limiting its scope which should be construed in accordance with the accompanying claims.

I claim:

1. Displacement pump apparatus comprising a first reciprocating member, a second reciprocating member connected to said first reciprocating member, relative displacement means mounted between said first and second members, one of said first or second members being movable relative to said displacement means and the other of said first or second members to substantially eliminate flow fluctuations, said first or second member being movable by a profiled surface and follower means, said relative displacement means being screw means between said first and second members.

2. Displacement apparatus as in claim 1 wherein said follower is in contact with said profiled surface.

3. Displacement pump apparatus comprising a first reciprocating member, a second reciprocating member connected to said first reciprocating member, relative displacement means mounted between said first and second members, one of said first or second members being movable relative to said displacement means and the other of said first or second members to substantially eliminate flow fluctuations, said relative displacement means being a cylindrical cavity having fluid contained therein, said fluid acting on one of said first or second members and fluid displacement means in contact with a profiled surface, said fluid displacement means acting to displace said fluid from said cavity and to cause relative movement between said first and second members.

4. A method of substantially eliminating pump flow fluctuations by producing a desired motion profile for a first reciprocating member relative to a second reciprocating member comprising producing rotary motion in said first reciprocating member relative to said second reciprocating member and converting said rotary motion of said first reciprocating member to axial movement relative to said second reciprocating member.

5. The method according to claim 4 wherein said rotary motion is produced by profiled surface and follower means operable on said first reciprocating member and said rotary motion is converted to axial motion by screw means.

6. A method of substantially eliminating pump flow fluctuations by producing a desired motion profile for a first reciprocating member relative to a second reciprocating member comprising displacing said first member relative to said second member with piston and fluid means, said first member being displaced relative to said second member by said piston means operable on said fluid means by profiled track means.

* * * * *